July 30, 1968 A. MASTRO 3,394,939
FLUID PRESSURE ACTUABLE SEAL
Original Filed Nov. 15, 1965
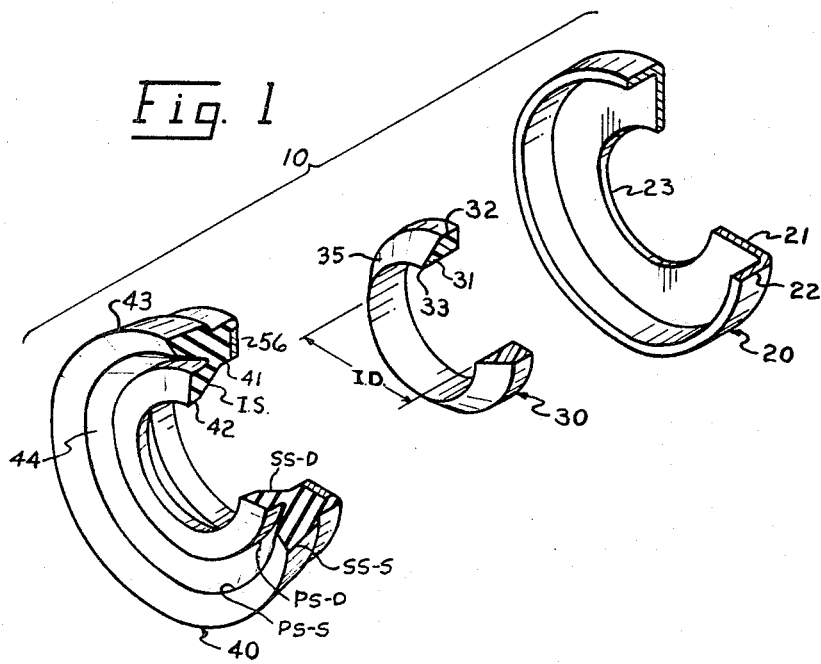
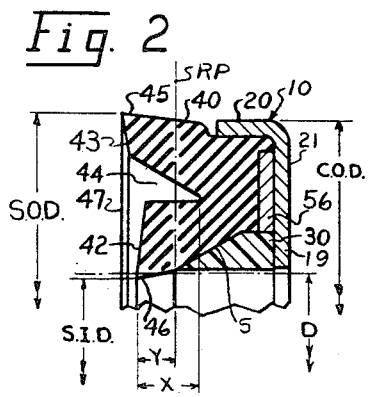
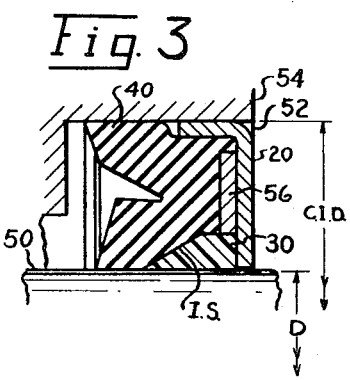
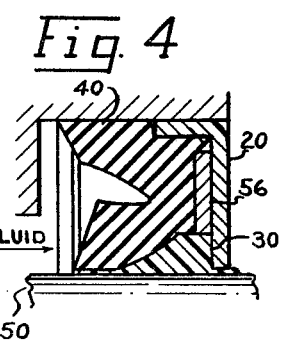
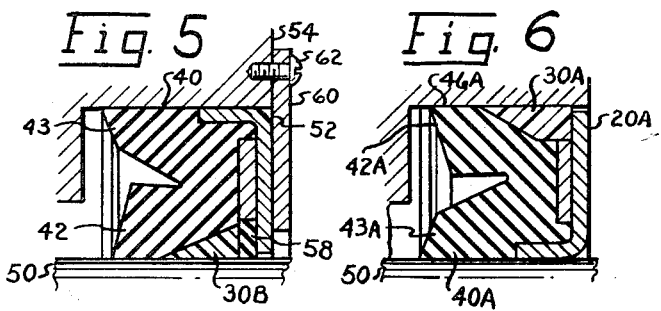

3,394,939
Patented July 30, 1968

3,394,939
FLUID PRESSURE ACTUABLE SEAL
Alex Mastro, Dunellen, N.J., assignor to Johns-Manville Corporation, New York, N.Y., a corporation of New York
Continuation of application Ser. No. 507,744, Nov. 15, 1965, which is a continuation-in-part of application Ser. No. 246,550, Dec. 21, 1962. This application Dec. 8, 1966, Ser. No. 600,277
23 Claims. (Cl. 277—1)

ABSTRACT OF THE DISCLOSURE

A sealing method and dynamic seal involving an elastomer primary sealing element and a synthetic resinous annulus having low friction characteristic, the annulus being extrudable by the elastomer element, the elastomer element and the annulus having parameters to facilitate the purposeful extrusion of the material of the annulus toward and to impart a low friction characteristic to a sealing lip of the elastomer element.

---

This is a continuation of copending application Ser. No. 507,744 filed Nov. 15, 1965, said application Ser. No. 507,744 being a continuation-in-part of parent application Ser. No. 246,550, filed Dec. 21, 1962, both now abandoned.

This invention relates generally to an improved fluid seal. More particularly, it relates to a radial seal for preventing the egress of fluids. While the invention has general utility for seal application, it is particularly adapted for use under high pressure service conditions, in which pressures in excess of 100 p.s.i. are encountered and most particularly those in the order of 500–1500 p.s.i. The novel features of the invention provide advantages in dynamic seals which may be utilized effectively in low pressure seals but provide particular advantages in high pressure seals.

One of the criteria by which dynamic seals are evaluated is their ability to maintain their sealing function when subjected to fluid pressure when one of the relatively moving parts to be sealed is subjected to rotating or reciprocating motion or a combination of rotating and reciprocating motion. This ability is sometimes expressed as the PV factor, P being the pressure in pounds per square inch (p.s.i.), and V being the velocity of the moving part expressed in linear feet per minute (f.p.m.). Generally, seals of the flexible elastomer lip-type are considered to have a maximum PV factor in the order of 10,000; braided asbestos or other fibrous packings are considered to have a maximum PV factor in the order of 50,000; and metallic mechanical packings or seals are generally considered to have a maximum PV factor in the order of 200,000, although it is reported that there are some very special metallic mechanical packings of complex design that have attained a PV rating of 1,000,000.

One of the problems that has confronted the industry has been the provision of a relatively low cost and simple seal design of the flexible elastomer lip-type that is competitive with and has a PV rating comparable to the so-called metallic mechanical seals. The use of rubber or other commonly employed elastomers as a fluid seal or as a part of a fluid seal has always been accompanied by problems such as extrusion and friction which deteriorates the rubber. These problems are compounded in systems employing fluid under high pressures.

In high pressure service conditions, resistance to frictional movement or blow-out requires that seals of elastomer materials be sufficiently rigid to resist excessive deformation. However, the elastomer material must be capable of a limited amount of resiliency or elasticity in order for the seal to be conformed or deformed into tight sealing engagement with the part to be sealed under no or low pressure conditions. These considerations require compromises within the very close limits. The difficulties are further increased by uncertainty of the type of service, continuous or intermittent, to which the seal may be subjected.

Various combinations of elastomeric and low friction synthetic resinous materials have been heretofore suggested to alleviate the problem of frictional drag in seals and to render the elastomeric material more corrosion resistant. However, most of these seals are designed primarily for low pressure service. One such combination suggested heretofore comprises a Teflon sleeve contiguous to the shaft member being sealed and a rubber sleeve backing up the Teflon sleeve in an arrangement wherein the Teflon is substantially unconfined. While such seals are satisfactory for low pressure service conditions and for a relatively short life, they are not suitable for relatively high pressure, i.e., in excess of 100 p.s.i., or for an extended time. It is well known that Teflon does not establish a seal as effective as rubber does, unless considerable force is exerted upon the Teflon. In addition, such synthetic resinous materials as Teflon have a cold-flow characteristic, vis flow or extrude when a light, continuous pressure is exerted. Consequently, unless such flow is restrained or controlled, such materials, per se, soon lose their sealing effectiveness in service.

It is an object of this invention to overcome the noted difficulties by the provision of a dynamic seal which resists leakage under both low and high pressure conditions over an extended time and with low frictional engagement.

A further object of this invention is to provide a positive seal for dynamic service which does not utilize metal mechanical sealing members but approaches so-called mechanical seals for effectiveness in regard to the PV factor.

Another object of this invention is to provide a unitized steel which is comparatively simple to fabricate and assemble and meets the exacting requirements for high pressure service.

To accomplish the stated objects, the novel sealing device of this invention embodies an elastomer sealing ring having a greater initial radial width than the distance or space between the relatively moving parts to be sealed. Preferably, the elastomer material should exhibit elasticity and tensile strength properties within limits that will effect the desired flexibility. Preferably, the sealing ring is in the form of a U, with the legs of the U defining resilient or yieldable sealing lips and extending generally parallel to the central axis of the ring to render the ring more deformable in a radial direction than axially. One of the legs is in static sealing engagement when installed, while the other leg is in dynamic sealing engagement. A front radial face of the ring is secured to rigid positioning means adapted to concentrically position the sealing device. The leg of the U adapted for dynamic sealing engagement is preferably provided with an outer peripheral circumferential surface that is sloped or tapered to define a recess between said surface and the concentric positioning means.

The recess is adapted to receive an annulus of low friction synthetic resinous material. Consequently, in the assembled position the annulus is bounded by the sealing ring, the concentric positioning means, and the part to be dynamically sealed. Preferably, the annulus has a tapered portion including a sloping face adapted to coincide with the sloping face of the sealing ring when concentrically assembled therewith and the annulus is circumvallated by the sealing ring.

The circumposition of the annulus by the sealing ring is significant because the sealing ring functions as an actuator, when subjected to increased pressure, to extrude the low friction synthetic material of the annulus. The coincident sloping surfaces of the annulus and the sealing rings are significant in that the annulus material tends to be extruded toward the dynamic sealing lip of the sealing ring and consequently impart the low friction characteristic to the dynamic sealing lip. The sloping surfaces are believed to be significant in that as increased fluid pressure is applied to the sealing ring, the sealing ring will tend to "ride-up" the slippery sloping surface of the annulus and reduce the interference between the dynamic sealing lip and the machine part being sealed.

The preferred ranges of hardness, elongation and tensile strength are also considered significant in order to provide a seal suitable for intermittent low and high pressure service. It is desirable to provide a sealing ring having sufficient elasticity so that the sealing element is sufficiently sensitive under low pressure service to maintain sealing engagement without influence from the back-up low friction element or at least until high pressure is applied. However, if the sealing ring is too elastic or soft, under high pressure it will tend to flow and the sealing engagement will be disrupted; furthermore, little or none of the fluid pressure force will be transmitted to the low friction element. Consequently, the low friction quality of the annulus will not be imparted to the sealing ring and the shaft area adjacent to the sealing lip of the shaft. If the sealing ring is too hard, extremely high pressure will be required to deform the ring and then the effectiveness of the seal will be substantially reduced at no or low pressure conditions; viz the relatively hard ring will not have sufficient resiliency to conform to the shaft and thus maintain fluid-tight sealing engagement.

The present invention not only obviates the disadvantages of seals which rely upon the use of synthetic resin materials as a primarly seal but the present invention takes advantage of the lubricating characteristic of low friction synthetic resin materials by preferentially positioning the material so that it is preferentially and controllably extruded to impart the low friction characteristic to the elastomer dynamic sealing lip of the sealing ring.

The invention will be more fully understood, and further objects and advantages thereof will become apparent by reference to the following detailed description in conjunction with the accompanying drawing, in which similar reference characters designate similar parts, and in which:

FIG. 1 is a pictorial view of a seal embodying features of this invention and in which the components are "exploded" to clearly illustrate the construction details;

FIG. 2 is a fragmentary radial cross-sectional view of an assembled but uninstalled annular seal of this invention;

FIG. 3 is a view similar to FIG. 2 but in an installed position with little or no fluid pressure;

FIG. 4 is a view similar to FIG. 3 illustrating the deformation taking place at high fluid pressure;

FIG. 5 is a view similar to FIG. 3 but of a sealing unit embodiment incorporating alternate and optional anti-extrusion means; and FIG. 6 is a view similar to FIG. 3 but of an arrangement wherein the sealing unit is in fixed relation with the shaft.

Referring to FIG. 1, there is shown the disassembled components of the sealing unit, generally designated by the numeral 10, embodying the features of this invention. The sealing unit 10 incorporates three principal elements: radial positioning means shown to be in the form of a rigid casing 20; an anti-friction annulus 30 of particular configuration, to be later described; and a sealing ring 40 of rubber or other elastomeric material possessing particular characteristics.

The casing 20 is shown to comprise a radial flange 21 and an axial flange 22. The radial flange 21 is provided with an opening 23, which opening corresponds generally to the diameter of the shaft 50 over which the seal 10 is to be positioned. However, the diameter of the opening 23 as defined by the terminal portion 19 of flange leg 21 is sufficiently greater than the diameter of the shaft to provide a minimum clearance, preferably in the order of .005 inch. The main function of the casing 20 is to provide means for positively positioning the seal 10 within chamber 52 of housing 54. Consequently, if the radial flange 21 is sufficiently thick, in an axial direction, to provide a landing, and if the sealing ring 40 is otherwise attached or adhered, as by bonding, to the radial flange 21, the axial flange 22 may be omitted in some installations.

The anti-friction annulus 30 is preferably comprised of synthetic resinous materials, filled or unfilled, having a coefficient of friction in the order of .01 to .3. The annulus 30 is shown to have a conical portion 31 and an orthogonal portion 32. The conical portion 31 may also be described as tapered or a right triangle when viewed as part of the radial cross section of annulus 30. The internal diameter of annulus 30 is preferably slightly greater than the diameter of shaft 50 to provide an initial clearance to facilitate installation. The phase "low friction inert synthetic resinous material" as employed in the description and the appended claims is intended to include those plastic materials possessing characteristics of fluorocarbons, of which polymerized tetrafluoroethylene sold under the trade name "Teflon" is exemplary, and more particularly the characteristics of low friction and extrudability. The physical properties of fluorocarbons which contribute to and are indicative of the comparative ease of its extrudability are its compressive modulus (7000–9000 p.s.i.) tensile modulus (generally 5800 p.s.i.) and hardness (Rockwell R58). These values are those published in the Plastics World, October 1960, pp. 44, 45.

The sealing ring 40 is preferably comprised of elastomeric material which exhibits good heat resistance at elevated temperatures. The term "elastomeric" or "elastomer" as used throughout this specification and the appended claims is intended to include all rubber and rubber-like materials, including synthetic polymers, having, inter alia, the properties of natural or reclaimed or vulcanized or synthetic rubber, and particularly the property of resiliency. A radical cross section of the ring 40 is generally of U-configuration with a thickness apex or base portion 41. The base 41 is wedged by the axial flange 22 or otherwise attached to the casing 20. The legs 42 and 43 extend in a generally axial direction in respect to the ring 40, and define an annular groove 44. Optionally, reinforcement means, shown to be in the form of metal washer 56, may be integrally molded with the body of ring 40 to facilitate positioning of ring 40 in respect to casing 20 and with respect to concentric relation of chamber 52 about shaft 50.

In the arrangement shown in FIGS. 2–5, the leg 42 may be aptly described as forming a dynamic lip section having a sealing side SS-D on the inside periphery of the ring 40 and a pressure side PS-D on the inside of the U. The leg 43 may be described as forming a static lip section having a sealing side SS-S on the outside periphery of the ring 40 and a pressure side PS-S on the inside of the U. Leg 42 carries dynamic sealing lip 46 while leg 43 carries static sealing lip 45. The dynamic lip section has a sloping surface S on the sealing side SS-D to facilitate the extrusion actuating function of the sealing ring 40.

As may be seen in FIG. 2, the outside diameter, designated as S.O.D., of the lip portion 45 of leg 43 in its relaxed state preferably is slightly greater than the diameter C.I.D. (FIG. 3) of the chamber 52 in which the seal 10 is to be installed, so that the lip 45 is compressed somewhat upon installation. The inside diameter, designated as S.I.D., of the lip section 46 of leg 42 in its relaxed state preferably is slightly smaller than the diameter D of the shaft 50 about which the seal 10 is to be installed, so that lip 46 is also compressed somewhat upon installation. The outside diameter, designated as C.O.D., of casing 20 is substantially equal to the chamber diameter (C.I.D.), to facilitate the positioning of the seal unit 10 within the chamber 52.

It will be noted that portions of inside peripheral surface, I.S., of ring 40 correspond substantially to the sloping surface 35 of tapered or conical portion 31 and to the surface of orthogonal portion 32 of annulus 30. When the components 30 and 40 are assembled and mounted about a shaft, the annulus 30 is in encased or circumvallated relation with ring 40. Thus, the annulus 30 is completely encased by and in abutting relation with the ring 40, the terminal portion 19 of radial leg 21 of casing 20, and the shaft 50.

In order to provide proper flexing of the lip 46 toward the shaft 50 or toward the central axis of the ring 40, during changing pressure conditions, it is desirable to have the groove 44 extend axially a distance equal to at least twice and preferably three to four times, the axial extent of lip 46. In FIG. 2, the axial extent of groove 44 is designated as dimension X while the axial extent of lip 46 is designated as dimension Y.

It is also important to note that the groove 44 extends in an axial direction away from the rear face 47 toward the base portion 41 through a radial plane RP extending through the terminal lip 33 of annulus 30. The combination of the encased relation of the annulus and extension of the groove 44 to the described region provide a particular feature of this invention, namely, an arrangement whereby the resinous material of annulus 30 is preferably and controllably extruded to the lip portion 46 and adjacent portion of shaft 50. As the fluid pressure increases and builds up during the run-in period, the pressure is transmitted through the lip 42 to the annulus 30 and the ring 40 is deformed from the position shown in FIG. 3 and is believed to assume a configuration such as shown in FIG. 4. In any event, some of the low frictional characteristic of the annulus 30 is imparted to the lip 46 and the adjacent shaft area. As a result less frictional heat is generated between the lip 46 and shaft 50. It will be appreciated that the tapered or angular configuration of the portion 31 of annulus 30 and the abutting sloping surface portion of ring 40 is important so that any force transmitted to annulus 30 has a component which will tend to extrude the major portion of annulus 30 toward lip 46. Because the ring 40 resiliently urges the annulus 30 both radially and axially, it will be apparent that a portion of resinous material from annulus 30 will tend to extrude through the clearance between the radial flange 21 and shaft 50. To deter excessive extrusion of the resinous material through the clearance space, an anti-extrusion annulus 58 of elastomer material, such as shown in FIG. 5, may be optionally provided. The annulus 58 is preferably in the form of a flat washer stretched tightly over the shaft 50.

When service conditions are encountered wherein the fluid pressure exceeds 75 p.s.i., additional retention means may be required to restrain the seal 10 within the chamber. Such retention means may take many forms and the annular plate 60, shown in FIG. 5, secured to housing 54 by screws 62, is illustrative of one form.

FIG. 6 illustrates an embodiment wherein the sealing unit 10A is in fixed relation with the shaft or rod 50A (except for the suffix A the reference numerals correspond to those employed in connection with corresponding elements of the arrangement shown in FIG. 3). It will be apparent that the sealing arrangement shown in FIG. 6 is literally an inside-out version of that shown in FIG. 3 and that otherwise the operational characteristics of the elements are the same as those of their corresponding elements.

It has been determined that improved results can be obtained in elastomer lip-type seals to the extent of increasing the PV factor twenty-fold when the described structural parameters are employed, and more particularly when the ring 40 is compounded from material possessing certain characteristics. One of the desirable attributes of such materials is that they have outstanding heat resistance, are e.g., able to withstand sustained and elevated temperatures (in the order of 400° F. and higher) without significant deterioration. The so-called vulcanized fluoroelastomer compounds (at least 60%, by weight, fluorine) have been found admirably suited for this purpose, and the products commercially available as Viton A–HV and Fluorel are exemplary.

Also, it has been found desirable to compound the elastomer material to provide the following listed physical properties within the designated ranges:

Tensile strength p.s.i. _____ 800–2000
Elongation, percent _____ 75–200
Hardness, Shore A _____ 86–99

From results of tests that have been conducted thus far, it appears that improved results are attained by utilizing an elastomer material having a relatively low elongation and a relatively high tensile strength, or an elastomer material having a relatively high elongation and a relatively low tensile strength.

All of the desirable possible combinations of elongation values with their corresponding tensile values have not been determined. However, it has been found that superior results are achieved with material compounded from Viton A–HV containing the necessary aid acceptors, such as dibasic lead phosphite; curing ingredients, such as zinc oxide; vulcanizing agents, such as hexa-metylene-diamine; and fillers, such as carbon black, to effect the original physical properties of the Viton to obtain the following values:

Tensile strength p.s.i. _____ 1600-1700
Elongation, percent _____ 105–115%
Hardness, Shore A _____ 92–98

A pair of seals of this invention compounded from the above-described materials and having the following physical properties:

Tensile strength, p.s.i. _____ 1640
Elongation, percent _____ 110
Hardness, Shore A _____ 95 were made and tested on a shaft, one-half inch diameter, for 96 hours under the following conditions and surprisingly, the seals fulfilled the requirements of the conditions which require a seal having a PV factor of 202,500:

| Shaft Linear Speed (f.p.m.): | Seal | Dynamic Lip ID (Inches) | | Fluid Pressure (p.s.i.) |
|---|---|---|---|---|
| | | Initial | Final | |
| 135 | Left | .480 | .500 | 1,500 |
| | Right | .480 | .480 | 1,500 |

| Seal | Max. Temperature, °F. | Average Operating Temperature, °F. | Leakage | |
|---|---|---|---|---|
| | | | Initial | Final |
| Left | 240 | 125 | Wetting [1] | 3.0 cc. |
| Right | 135 | 120 | Wetting [1] | Wetting.[1] |

[1] Wet to touch but insufficient to measure.

While the material from which the elastomer sealing ring 40 has been described in great detail in regard to the preferred formulation and the preferred physical properties, together with other certain and specific embodiments, many modifications thereof are possible. Therefore, this invention is not to be restricted except as necessitated by the prior art and by the spirit of the appended claims.

What I claim is:

1. A fluid seal for interposition between relatively movable parts and for exposure to fluid under pressure, comprising in combination:
   (a) a sealing ring comprising elastomer material and having a radial cross section generally in the form of a U having a base and axially extending legs, with the legs of the U defining yieldable lip sections including a fluid actuable dynamic lip section having a peripheral sealing side and having a pressure side on the inside of the U and a yieldable peripheral dynamic sealing lip on said peripheral sealing side and adapted to engage one of said parts to be sealed,
   (b) said seal having therein an annular recess located on the same side of the seal as said sealing lip and open to that side of the seal and toward the said one of the parts to be sealed, when the seal is installed;
   (c) an annulus in said annular recess and comprising synthetic resinous material having low friction and extrudability characteristics substantially those of fluorocarbons; and
   (d) rigid radial positioning means for concentrically positioning said sealing ring, said positioning means being attached to the base of said sealing ring; and
   (e) confining means which together with said dynamic lip section are adapted to confine said annulus in said recess and against the said one of said parts to be sealed, when said seal is installed, so that under increased fluid pressure exerted on said sealing ring and particularly on the inside of the U and said pressure side of said dynamic lip section extrusion of the material of said annulus toward said dynamic lip is facilitated and extrusion of the material of said annulus away from said dynamic lip is deterred,
   (f) said annulus, as viewed in radial cross section having a wall radial thickness which generally progressively increases, as said thickness is progressively measured along an axial line extending away from said dynamic sealing lip and toward said confining means, to define a generally tapered portion.

2. A fluid seal as described in claim 1, wherein: the Rockwell hardness of the resinous material of said annulus is in the general order of R58 and its coefficient of friction is in the order of .01 to .3.

3. A fluid seal as described in claim 1, wherein: said annulus as a compression modulus in the general order of 7000–9000 p.s.i.

4. A fluid seal as described in claim 1, wherein: said rigid radial positioning means includes a portion extending radially toward said part to be sealed and adjacent to said annulus, and said portion forms said confining means.

5. A fluid seal is described in claim 4, in which said positioning means comprises:
   a rigid metal annular casing forming said portion extending radially toward said part to be sealed, and
   a reinforcing washer attached to the base of said sealing ring.

6. A fluid seal as described in claim 4, which further comprises:
   an anti-extrusion ring of elastomer material positioned axially between said annulus and said radial positioning means.

7. A fluid seal as described in claim 1, wherein: said sealing ring is comprised of elastomer material having a tensile strength in the range of 800–2000 p.s.i., an elongation in the range of 75–200%, and a Shore A hardness in the range of 86–99.

8. A fluid seal as described in claim 1, wherein: said sealing ring is comprised of fluoroelastomer material having a tensile strength generally in the order of 1600–1700 p.s.i., an elongation generally in the order of 105–115% and a Shore A hardness of 92–98.

9. A fluid seal as described in claim 1, wherein: said dynamic lip section has a sloping section on said peripheral sealing side which extends from said dynamic lip, and said annulus has a sloping surface substantially corresponding to the sloped surface of said dynamic lip section.

10. A fluid seal as described in claim 1, wherein: said legs of the U also have an internal groove therebetween which extends in an axial direction from the open end of the U at least to a radial plane normal to the axis and passing through a portion of said annulus.

11. A fluid seal as described in claim 10, wherein: said groove extends axially a distance at least twice the axial extent of said dynamic sealing lip.

12. A fluid seal for interposition between relatively movable parts, comprising in combination:
    (a) a sealing ring comprising elastomer material and having a radial cross section generally in the form of a U having a base and axially extending legs, with the legs of the U defining yieldable lip sections including a fluid actuable dynamic lip section having a peripheral sealing side and having a pressure side on the inside of the U and a yieldable peripheral dynamic sealing lip on said peripheral sealing side and adapted to engage one of said parts to be sealed, said seal having therein an annular recess located on the same side of the seal as said sealing lip and open to that side of the seal and toward the said one of the parts to be sealed, when the seal is installed;
    (b) an annulus seated in said annular recess and comprising synthetic resinous material having extrudability and low friction characteristics substantially those of fluorocarbons;
    (c) said legs of the U also having an internal groove therebetween which extends in an axial direction from the open end of the U at least to a radial plane normal to the axis and passing through a portion of said annulus; and
    (d) confining means including a portion extending radially toward said part to be sealed and together with said dynamic lip section being adapted to confine said annulus in said recess and against the said one of said parts to be sealed, when said seal is installed, so that under increased fluid pressure exerted on said sealing ring and particularly on the inside of the U and on said pressure side of said dynamic lip section extrusion of the material of said annulus toward said dynamic lip is facilitated and extrusion of the material of said annulus away from said dynamic lip is deterred;
    (e) said annulus, as viewed in radial cross section, having a wall radial thickness which generally progressively increases, as said thickness is progressively measured along an axial line extending away from said dynamic sealing lip toward said confining means, to define a generally tapered portion.

13. A fluid seal for interposition between relatively movable parts, comprising in combination:
    (a) a sealing ring comprising elastomer material and having a radial cross section generally in the form of a U having a base and axially extending legs, with the legs of the U defining yieldable lip sections including a dynamic lip section having a peripheral sealing side and having a pressure side on the inside of the U and a yieldable peripheral dynamic sealing lip on said peripheral sealing side and adapted to engage one of said parts to be sealed, said seal having therein an annular recess located on the same side of the seal as said sealing lip and open to that side of the seal and toward the said one of the parts to be sealed, when the seal is installed;

(b) an annulus seated in said annular recess and comprising synthetic resinous material having a coefficient of friction in the order of .01 to .3 and a compression modulus in the general order of 7000–9000 p.s.i.; confining means including a portion extending radially toward said part to be sealed and adjacent to said annulus, and together with said dynamic lip section being adapted to confine said annulus in said recess and against the said one of said parts to be sealed, when said seal is installed, so that under increased fluid pressure exerted on said sealing ring and particularly on the inside of the U and on said pressure side of said dynamic lip section extrusion of the material of said annulus toward said dynamic lip is facilitated and extrusion of the material of said annulus away from said dynamic lip is deterred;

(c) said annulus, as viewed in radial cross section having a wall radial thickness which generally progressively increases, as said thickness is progressively measured along an axial line extending away from said dynamic sealing lip and toward said confining means, to define a generally tapered portion.

14. A fluid seal for interposition between relatively movable parts, comprising in combination:
(a) a sealing ring comprising elastomer material and having a radial cross section generally in the form of a U having a base portion and axially extending legs, with the legs of the U defining yieldable lip sections including a fluid actuable dynamic lip section having a peripheral sealing side and having a pressure side on the inside of the U and a yieldable peripheral dynamic sealing lip on said peripheral sealing side and adapted to engage one of said parts to be sealed,
(b) said dynamic lip section also having a sloping surface on said peripheral sealing side which extends from said dynamic lip,
(c) said seal having therein an annular recess located on the same side of the seal as said sloping surface and open from said sloping surface and toward the said one of the parts to be sealed, when the seal is installed;
(d) an annulus positioned in said annular recess and comprising synthetic resinous material having extrudability and low friction characteristics substantially those of fluorocarbons, said annulus, as viewed in radial cross section having a wall radial thickness which generally progressively increases, as said thickness is propressively measured along an axial line extending away from said dynamic sealing lip toward said confining means, to define a generally tapered portion;
(e) rigid radial positioning means to which the base of said sealing ring is attached for concentrically positioning said seal between said parts, and
(f) confining means including a portion extending radially toward said part to be sealed and adjacent to said annulus, and together with said dynamic lip section being adapted to confine said annulus in said recess and against the said one of said parts to be sealed, when said seal is installed, so that under increased fluid pressure exerted on said sealing ring and particularly on the inside of the U and on said pressure side of said dynamic lip section extrusion of the material of said annulus toward said dynamic lip is facilitated and extrusion of the material of said annulus away from said dynamic lip is deterred.

15. A fluid pressurized seal for interposition between relatively movable parts and for exposure to fluid under pressure, comprising:
(a) an annulus of low friction synthetic resinous material, said annulus having a radial cross section which includes a tapered portion;
(b) a sealing ring of elastomer material, said ring having a radial cross section of generally U shape, with the legs of the U extending generally parallel to the central axis of the ring and defining a recess which is open to the fluid being sealed,
(c) said ring radially encompassing at least the tapered portion of said annulus and resiliently urging said tapered portion toward a part to be sealed;
(d) said ring also having a front radial face; and rigid radial positioning means for concentrically positioning said ring, including a reinforcing washer attached to said front radial face of said ring and a rigid metal annular casing, and said annulus being restricted in movement as an integral unit by virtue of being encased by said sealing ring and said rigid positioning means.

16. A fluid seal for interposition between relatively moving parts, comprising:
(a) an annulus of low friction inert synthetic resinous material;
(b) said annulus having a radial cross section which includes a triangular portion and an orthogonal portion, said orthogonal portion including a front radial face;
(c) an elastomer ring having leg portions defining a static sealing portion and a dynamic sealing portion,
(d) said elastomer ring having a peripheral surface sloping from said dynamic sealing portion, and encasing said triangular portion of said annulus whereby extrusion of said annulus toward said dynamic sealing portion is facilitated,
(e) said elastomer ring also having a front radial face;
(f) an annular reinforcing member at the front radial face of said elastomer ring and circumposing the orthogonal portion of said annulus; and
(g) a metal casing having a radial leg and an axial leg, said axial leg, together with said reinforcing member, wedging at least a portion of said elastomer ring, and
(h) said radial leg, together with said elastomer ring said reinforcing member, and a part to be sealed, completely encasing said annulus to restrain movement thereof.

17. A fluid seal for interposition between relatively movable parts and for exposure to fluid under pressure, comprising in combination:
(a) a sealing ring comprising elastomer material including a fluid actuable dynamic lip section having a yieldable dynamic sealing lip adapted to engage one of said parts to be sealed;
(b) said seal having therein an annular recess located on the same side of the seal as said sealing lip and open to that side of the seal and toward the said one of the parts to be sealed, when the seal is installed;
(c) an annulus in said annular recess and comprising synthetic resinous material having low friction and extrudability characteristics substantially those of fluorocarbons, said resinous material being extrudable by said sealing ring when fluid pressure is exerted thereon; and
(d) rigid positioning means for radially positioning said sealing ring, said positioning means being fixedly secured in relation to said sealing ring;
(e) confining means confining said annulus on a side of said annulus axially spaced from said sealing lip to deter extrusion of the synthetic resinous material of said annulus away from but facilitate extrusion of said synthetic resinous material in an axial direction toward said dynamic lip;

(f) said annulus, as viewed in radial cross section, having a wall radial thickness which generally progressively increases, for at least a portion of the axial thickness of the annulus, when said radial thickness is measured along an axial line extending away from said sealing lip and toward said confining means.

18. A fluid seal as described in claim 17, wherein:
said rigid radial positioning means includes a portion extending radially toward said part to be sealed and adjacent to said annulus, and
said portion forms said confining means.

19. A fluid seal, comprising in combination:
(a) a sealing ring comprising elastomer material and having a yieldable dynamic sealing lip adapted to engage a part to be sealed;
(b) confining means secured to said sealing ring and including a portion extending radially toward said part to be sealed, when the seal is installed;
(c) said portion and said sealing ring defining therebetween a recess;
(d) an annulus in said recess and comprising synthetic resinous material having low friction and good extrudability characteristics substantially those of fluorocarbons, said resinous material being extrudable by said sealing ring when fluid pressure is exerted thereon;
(e) said confining means, together with said sealing ring, confining and restraining said synthetic resinous material of said annulus against substantial extrusion in any direction except primarily in an axial direction toward said dynamic sealing lip, where it engages said part to be sealed;
(f) said annulus, as viewed in radial cross section, having a wall radial thickness which generally progressively increases, as said thickness is progressively measured along an axial line extending away from said dynamic lip toward said confining means, to define a generally tapered portion and to adapt, together with said confining means, said annulus for purposeful extrusion of said synthetic resinous material primarily in an axial direction toward said dynamic sealing lip, where it engages said part to be sealed, when pressure is exerted on said synthetic resinous material by said sealing ring.

20. A fluid seal for interposition between relatively movable parts and for exposure to fluid under pressure, comprising in combination:
(a) a sealing ring comprising elastomer material and having a yieldable dynamic lip engageable with a part to be sealed,
(b) said sealing ring having an annular recess located on the same side of the seal as and adjacent to said sealing lip and open to that side of the seal;
(c) an annulus in said recess and comprising synthetic resinous material having the extrudability and low friction characteristics substantially those of fluorocarbons, said resinous material being extrudable by said dynamic lip when fluid pressure is exerted thereon,
(d) confining means bounding said annulus on the side of said annulus axially opposing the side corresponding to said dynamic lip,
(e) said confining means, together with said sealing ring, confining and restraining said synthetic resinous material of said annulus against substantial extrusion in any direction except primarily in an axial direction toward said dynamic sealing lip, where it engages said part to be sealed,
(f) said ring, as viewed in radial cross section, having a sloping edge portion bounding at least a portion of said recess, the slope of said edge portion being radially away from said dynamic lip and generally toward said confining means, and having a major axial component, in respect to the axis of said ring, whereby with said synthetic material of said annulus thus confined and restrained by said ring and said confining means against substantial extrusion in any other direction, fluid pressure on said ring causes it to extrude synthetic resinous material of said annulus primarily in an axial direction toward said dynamic sealing lip, where it engages said part to be sealed.

21. A fluid sealing device for interposition between relatively movable parts and for exposure to fluid under pressure, comprising in combination:
(a) a sealing ring comprising elastomer material and having a fluid pressure actuable section including a yieldable dynamic sealing lip engageable with a part to be sealed;
(b) confining means in axially spaced relation with said sealing lip and defining therebetween a recess; and
(c) an annulus in said recess and having a radial wall thickness which generally increases, for at least a portion of the axial thickness of the annulus, along an axial line extending away from said dynamic sealing lip toward said confining means,
(d) said annulus comprising synthetic resinous material having extrudability and low friction characteristics substantially those of fluorocarbons, said resinous material being extrudable by said sealing ring when fluid pressure is exerted thereon,
(e) said annulus being radially bounded by at least a portion of said actuable section for purposeful extrusion of said resinous material of said annulus primarily in an axial direction toward said dynamic sealing lip for lubricating said lip where it engages said part to be sealed when said section is actuated by fluid pressure,
(f) said confining means confining said synthetic resinous material of said annulus so as to deter extrusion of said synthetic resinous material away from said sealing lip,
(g) said confining means, together with said sealing ring, confining and restraining said synthetic resinous material of said annulus against substantial extrusion in any direction except primarily in an axial direction toward said dynamic sealing lip, where it engages said part to be sealed.

22. The method of sealing relatively movable parts, comprising:
(a) providing a sealing ring comprising elastomeric material and having a fluid actuable dynamic sealing section including a sealing lip,
(b) providing an annulus comprising synthetic resinous material having a low coefficient of friction and being extrudable under pressures transmitted by said sealing section;
(c) positioning said ring and said annulus between said relatively movable parts, with said annulus being adjacent to said dynamic sealing lip and being radially bounded by at least a portion of said sealing section; and
(d) actuating said dynamic sealing section with fluid pressure and confining and restraining said material of said annulus against extrusion away from said sealing lip when said sealing section is under actuation by said fluid pressure and thereby extruding synthetic resinous material of said annulus primarily toward said sealing lip and deterring extrusion away from said sealing lip.

23. The method of sealing the leakage of a fluid under pressure between relatively movable parts, comprising the steps of:
(a) positioning an elastomeric sealing ring having a base portion and a fluid pressure actuable dynamic sealing section, including a sealing lip, between said relatively movable parts in a manner to expose said dynamic sealing section to the pressure of said fluid when in service;
(b) providing an annulus comprising synthetic resinous material, which material is extrudable by said elastomer ring, in radially bound relation with at least a portion of said dynamic sealing section; and
(c) actuating said dynamic sealing section by the pressure of said fluid, while securing said base portion of said sealing ring in concentric position in respect to one of said parts to be sealed and while restraining said synthetic resinous material of said annulus against extrusion away from said sealing lip, to transmit pressure of said fluid to said annulus and thereby extrude synthetic resinous material of said annulus primarily toward said sealing lip.

References Cited

UNITED STATES PATENTS

| | | | |
|---|---|---|---|
| 2,804,324 | 8/1957 | Stallings | 277—153 |
| 2,932,535 | 4/1960 | Peckii et al. | 277—152 X |
| 3,071,386 | 1/1963 | Scannell | 277—177 |
| 3,131,611 | 5/1964 | McLaughlin | 92—252 X |

FOREIGN PATENTS

| | | |
|---|---|---|
| 1,297,515 | 5/1962 | France. |
| 873,384 | 7/1961 | Great Britain. |

SAMUEL ROTHBERG, *Primary Examiner.*